May 11, 1965 D. DOW 3,182,742
ELECTRIC DRIVE MECHANISM AND METHOD OF OPERATING SAME
Filed Aug. 9, 1961 2 Sheets-Sheet 1
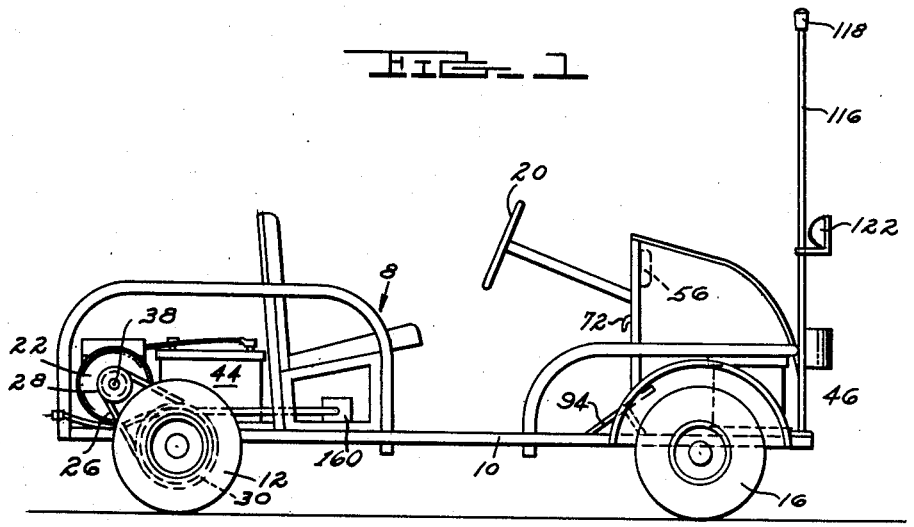
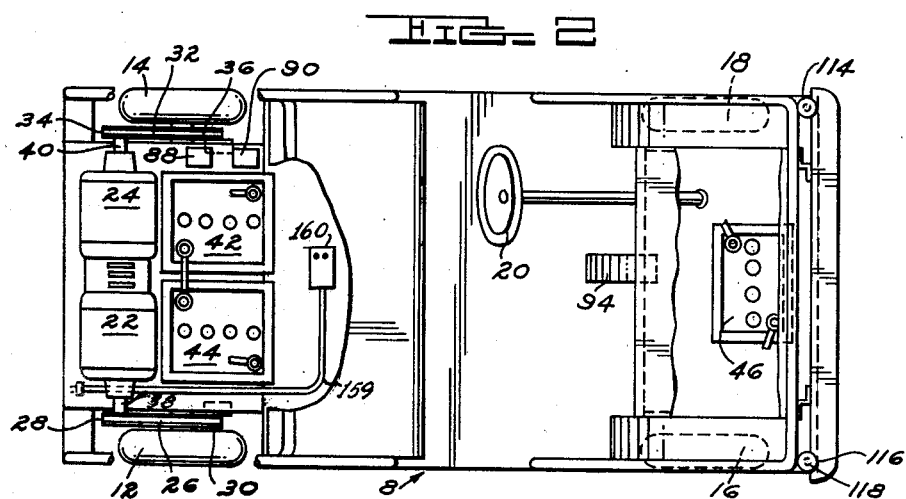
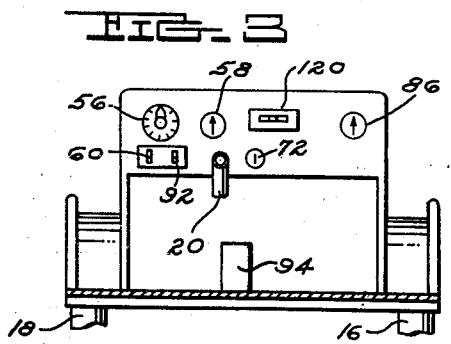
INVENTOR.
DOUGLAS DOW
BY
Burton & Parker
ATTORNEYS

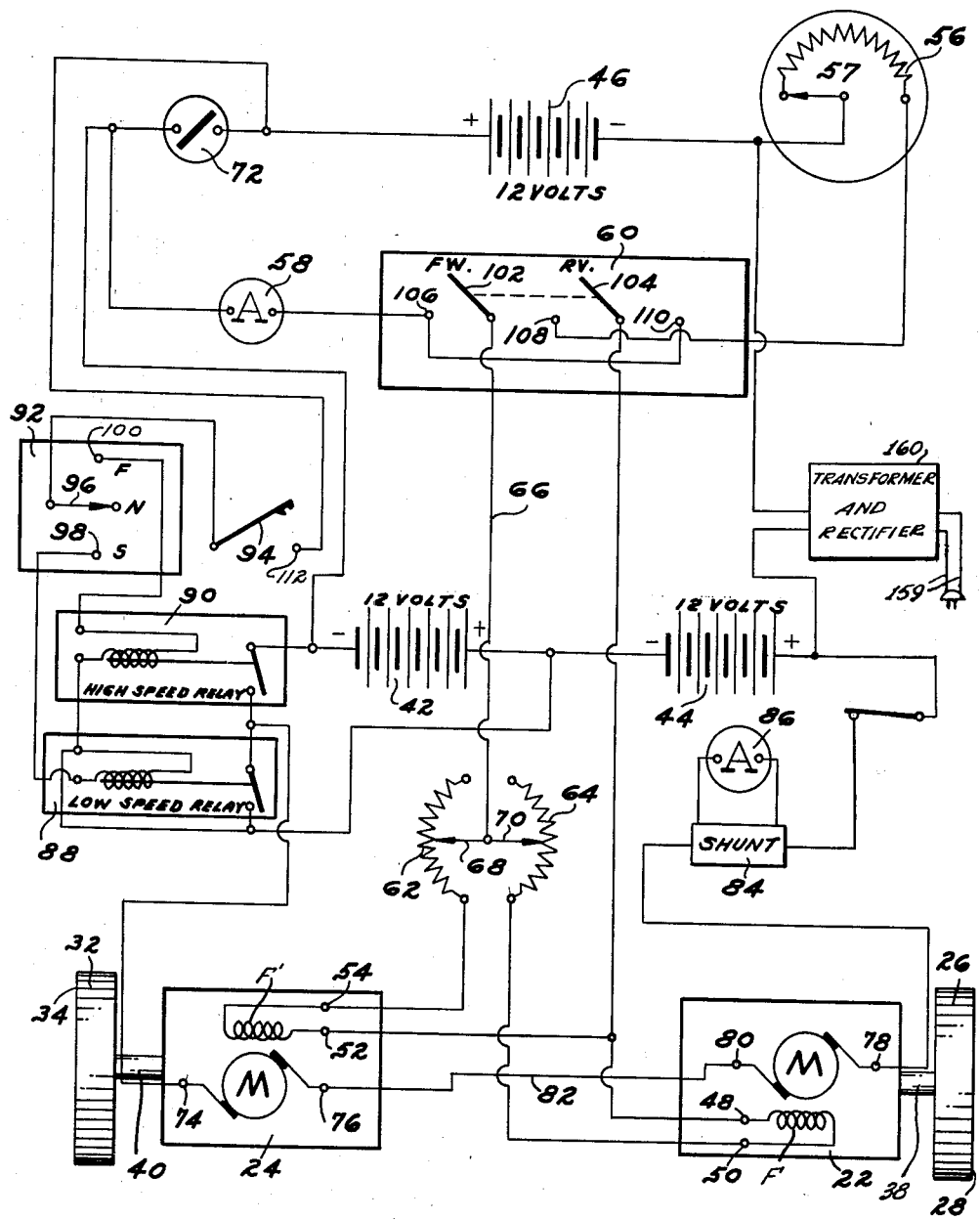

United States Patent Office 3,182,742
Patented May 11, 1965

3,182,742
ELECTRIC DRIVE MECHANISM AND METHOD OF OPERATING SAME
Douglas Dow, 1052 Seminole, Detroit, Mich.
Filed Aug. 9, 1961, Ser. No. 130,272
2 Claims. (Cl. 180—14)

This invention relates to improvements in electric drive mechanism and method of operating same; the invention having particular, though not exclusive utility in the propulsion of land vehicles.

More particularly the invention relates to an electric drive mechanism comprising a direct current motor and battery assembly, or other portable source of relatively limited electrical energy. While the invention would have utility in propulsion of vehicles obtaining the necessary electrical energy from a trolley, third rail, internal combustion engine and generator set, nuclear reactor generator, etc., it is particularly adapted for use with batteries, fuel cells or the like in which the available energy is relatively limited and decreases with the length of use.

The invention comprises a rotary electric direct current motor connected in such fashion to its source of electrical energy that the advantages of the series type and shunt type motors are obtained without the disadvantages of each. For example, the motor has a high starting torque, similar to a series motor, but without the tendency of a series motor to slow down with a slightly increased load, and without the jerk attendant with a series motor upon changing the impressed voltage. Further, the motor has a relatively constant speed characteristic under varying load conditions similar to a shunt motor, but without the low torque starting characteristics of a shunt motor. Unlike the series motor the voltage impressed on the armature may be increased by large increments without the necessity of heavy switch gear and without the attendant jerk as the motor increases in speed. The arrangement is such that the motor draws a relatively low current at the time it is started under a load, and for this reason the invention is particularly suitable for use with the fuel cell whose current output is limited, and which unlike the conventional lead-acid or nickel-cadmium battery cannot furnish large amperages for short periods.

Another advantage of my improved electric drive mechanism is that the circuitry connecting the field circuit to the battery or other source of E.M.F. is such that the field may be operated at its peak efficiency or, in other words, close to its saturation point. Further, because of the circuitry connecting the motor to the source of E.M.F. the problems of arcing between switch points, the heavy surges of current and high induced voltages attendant upon opening and closing of the motor circuits are substantially avoided.

To accomplish the aforementioned desirable results the field circuit of the motor is energized from an entirely separate source of electrical energy than is the armature and the armature and field are controllable independently of one another, with the field being energized prior to energization of the armature, and being continuously energized during interruptions in the armature circuit to effect speed changes. As a result of this the motor is capable of operating at a peak efficiency under widely varying load conditions, the switching and control of the motor may be made simple and economical, and the drive lends itself to regenerative braking through charging of the batteries.

With the improved drive connected to a road-driving wheel of a land vehicle the vehicle speed may be varied by connecting serially in the armature circuit a varying number of cells. To accommodate varying road conditions (such as concrete, dirt, gravel, or soft ground) the voltage impressed across the field winding may be varied.

Other objects, advantages and meritorious features will more fully appear from the specification, claims, and accompanying drawings wherein:

FIG. 1 is a side elevation of an illustrative embodiment of a land vehicle with which my improved electric drive assembly may be used;

FIG. 2 is a top view of the vehicle of FIG. 1;

FIG. 3 is a view of the dashboard of the vehicle;

FIG. 4 is a schematic wiring diagram of an illustrative embodiment of my improved electric drive assembly; and FIG. 5 is a schematic diagram of the vehicle of FIGS. 1–3 with an auxiliary engine-generator set mounted on a trailer detachably connected to the rear end of the vehicle.

As above mentioned the drive mechanism disclosed herein is particularly well suited for use in an electric automobile or the like. An illustrative embodiment of such vehicle is shown in FIGS. 1–3 at 8 as including a frame 10 suitably supported on road wheels 12, 14, 16 and 18 of which 12 and 14 are driving wheels. Wheels 16 and 18, through suitable steering mechanism, including a steering wheel 20, guide the direction of the vehicle. Each driving wheel is driven by its own direct current reversible motor, namely motors 22 and 24, through any suitable mechanism such as a chain 26 and sprockets 28 and 30 for motor 22 and a chain 32 and sprockets 34 and 36 for the motor 24. Sprockets 28 and 34 are mounted on the armature shafts 38 and 40 of the motors to be driven by and to drive the same. Sprockets 30 and 36 are connected to the driving wheels to drive and be driven by the same. The chains are entrained over the sprockets.

In lieu of two motors one might be used with a suitable differential drive between it and the road wheels 12 and 14. The same principles hereinafter discussed apply whether one or two motors are involved.

The field windings of the motors are connected to one source of electric energy, and the armature windings of the motors are connected to another and electrically independent source of electrical energy, with the voltage impressed upon the field windings and the voltage impressed upon the armature windings being independently variable. Hereinafter reference is frequently made to a battery or batteries. This term or terms is used generically to indicate a source of D.C. electrical energy, such as the conventional lead-acid or nickel-cadmium battery or a fuel cell. In essence the field windings are connected to a field battery and the armature windings to an armature battery with the batteries and connections provided between them being such that during operation of the vehicle, that is during reverse, low and high speed operation, the field and armature circuits and their batteries are electrically independent.

For purposes of suitable weight distribution the motors 22 and 24 may be mounted at the rear of the vehicle adjacent the driving wheels 12 and 14. Just ahead of these motors are a plurality of cells comprising one source of electrical energy. Such cells may comprise a pair of batteries 42 and 44 which supply electrical energy for the armature windings of the motors 22 and 24. These batteries may be of the conventional lead-acid type, or the newer nickel-cadmium type battery, or might be replaced by fuel cells, or other suitable source of electrical energy. As there is a relatively high amperage current between these batteries and the armature windings of the motors it is desirable that these batteries be placed close to the motors to keep the motor armature leads short. Mounted adjacent the front end of the vehicle over the guiding wheels 16 and 18 is another source of electrical energy, shown as in the form of a conventional lead-acid or nickel-cadmium type battery 46 consisting of a number of cells. As with the batteries 42 and 44, battery 46 may be replaced with fuel cells or other suitable source of electrical energy.

As mentioned above, each of the motors 22 and 24 includes a field winding and an armature winding. These two windings are so arranged that they are electrically independent of each other, that is to say the electrical energy which flows through the field winding does not thereafter flow through the armature winding, nor does part of the current which flows through the field winding flow through the armature winding, or vice versa. It is not intended to mean that there is no electro-magnetic coupling between the field and armature windings, which of course there is. However, apart from the latter the two circuits are independent of each other.

FIG. 4 shows motor 22 provided with a pair of field winding lead wire terminals 48 and 50 and motor 24 with a corresponding pair of terminals 52 and 54. These terminals are connected to opposite ends of the field windings of the motors. The field windings of the motors may be and are shown as connected together in parallel with the battery 46. However it is to be understood that they may be and are preferably connected together in series with the battery. The field circuit in addition to the battery 46 and the field windings of each motor includes a field resistor 56 having a movable contact 57 shiftable from a position of infinite resistance to successive positions of decreasing resistance to vary the voltage impressed upon the field windings, an ammeter 58, and a forward and reverse switch 60. A balancing resistor is also provided including a pair of individual resistances 62 and 64 each swept by a contact connected to lead 66 from the switch 60, the contacts being indicated at 68 and 70. The balancing resistance is used to initially balance the magnetic strength of the field windings between the two motors so that the counter electromotive forces thereof are equal. An "ignition key" switch 72 may be provided so that the vehicle can be "locked" when unattended.

The armature circuit for the motors which is normally electrically independent of the field circuit, includes terminals 74 and 76 at opposite ends of the armature winding for the motor 24 and terminals 78 and 80 at opposite ends of the armature winding for motor 22. Lead 82 connects together terminals 76 and 80 so that the armature coils of the motors are connected in series. The armature circuit also includes a shunt 84 across which is connected a meter 86 for reading the amperage in the armature circuit. Switch means in the form of a pair of relays 88 and 90 together with a speed control switch 92 and an off-on, or what might be termed "accelerator" switch 94, serve to vary the voltage impressed across the armature windings by virtue of connecting battery 44 only in the armature circuit, or both batteries 42 and 44 in series in the armature circuit. With battery 44 only connected, twelve volts in the illustrative embodiment shown in FIG. 4 would be impressed across the armature windings. With battery 42 connected serially with battery 44, twenty-four volts would be impressed across the armature windings.

With the movable contact 96 of the speed control switch 92 at the position shown, closure of switch 94 will fail to excite the armature windings, however with contact 96 touching contact 98, relay 88 is energized thereby serving to connect battery 44 alone in series with the armature windings. With contact 96 touching contact 100, batteries 42 and 44 are serially connected to the motor armatures to increase the voltage impressed across the armature windings. By tracing through the circuitry shown, the above arrangements will be found to exist.

In order to start the vehicle from rest, the key switch 72 is closed. Switch 60 is manipulated to position its contacts 102 and 104 either for forward or reverse operation of the vehicle, respectively, either touching contacts 106 and 108 or touching contacts 108 and 110. The movable contact 57 of resistor 56 is moved to impress a voltage across the field windings of the motors. After the magnetic field surrounding the field windings has had an opportunity to build up, which will occur very rapidly, contact 96 of the speed control switch is moved to touch either contact 98 or 100 and contact 94 is moved to touch contact 112. The electromagnetic reaction between the armature and field in the well known fashion serves to turn the armature and thereby drive the vehicle. Once the vehicle is up to speed the field resistor may be adjusted to provide the most efficient operation of the system.

By virtue of having the field windings excited prior to the armature windings from a source of electrical energy unaffected by the energization of the armature windings, a number of positive advantages result, some of which are as follows:

(1) The high current drain on the batteries is not as prolonged as with a series or shunt motor;
(2) The acceleration is smooth and rapid;
(3) The motors may be energized from sources of electrical energy not having high amperage output capabilities, such as the fuel cell;
(4) A high starting torque is provided;
(5) The switch gear or armature circuit controllers may be less complicated as armature voltages may be increased or decreased in larger steps than with a shunt or series motor without the attendant jerkiness of operation; and
(6) The switch contact points in the armature and field circuits may be lighter as the arcing therebetween is minimal.

These advantages result because the armature current drain on the armature battery does not affect the impressed voltage on the field supplied by the field battery, and as the field flux is at constant pre-selected strength, rotation of the armature winding in such flux yields the maximum counter electromotive force at every instant during acceleration of the armature to reduce the armature current. Also, the torque is high because of the constant strength of the field flux.

By exciting the armature and field windings from separate batteries the disadvantageous starting and accelerating characteristics of battery-powered shunt motors are avoided. In the shunt motor, upon applying a voltage either for starting or acceleration, the heavy inrush of current to the armature depletes the available supply of ions at the electrodes of the battery with a resulting drop in terminal voltage of the battery. This reduces the voltage applied to the field of the shunt motor and as a consequence reduces the field current, flux, and torque, just when torque is most needed, and allows a prolongation of the high current drain on the battery. Therefore my improved system where the field flux is unaffected by the inrush of current to the armature windings, will reduce the amount of electric energy expended by the armature batteries, and for that matter the field batteries, as the vehicle accelerates from a standstill, or as it accelerates between speed changes during its motion.

Also it will be noted, the field circuit is not interrupted during changes in the voltage impressed across the armature windings during operation of the vehicle. When the speed control switch 92 is shifted to bring movable contact 96 into engagement with contact 100, and thereby serially connect batteries 42 and 44 with the motor armatures, the field circuit remains unbroken. By continuously energizing the field winding the magnetic field established by the field winding is present throughout the interruptions of the armature current and when battery 42 is connected serially with battery 44, or during a "down shift" when battery 42 is disconnected from the armature circuit, or when the operator lifts his foot from the "accelerator" 94 to allow the vehicle to coast, or depresses the "accelerator" to again energize the armature circuit, and as a result the high armature currents associated with series and shunt motors when they are connected and disconnected from their power circuits, are avoided. Consequently relatively lighter switches may be used in the armature circuit, arcing between contact points is reduced, complex multi-point armature circuit controllers are eliminated, as well as controllers for field windings, and of interest to the passengers, acceleration is smooth and rapid and satisfying without the jerkiness attendant with other systems of electric drives. This response to increased or decreased armature voltage gives superior performance for safe driving in traffic.

A regenerative braking effect is also obtained whenever the speed of the vehicle is such that the counter electromotive force exceeds the voltage of the armature battery or batteries. This is frequently obtained on a downgrade or during a downshifting from a series connection of batteries 42 and 44 to a connection of only battery 44 in the armature circuit. Of course the foot switch 94 must be closed to obtain the regenerative braking effect.

I have found that the requirements or performance desired from an electric drive for an automotive type vehicle are best met by the system disclosed herein where variable torque requirements involved in aceleration and varying speed may be accomplished by varying the voltage applied to the armature while the variable torque requirements resulting from changes in soil or pavement conditions, steep grades (ramps, etc.) are best met by changing the flux strength of the field windings. The additional torque required by hills is similar to that required by acceleration and is due to the necessity of overcoming the gravity, or acceleration due to gravity, upon the mass of the vehicle.

The dashboard for the vehicle shown in FIGS. 1 and 2 is illustrated in FIG. 3 where the variable field resistor is indicated at 56, the forward and reverse switch at 60, the field circuit ammeter at 58, the armature circuit ammeter at 86, the key switch at 72 and the speed control switch at 92. The "accelerator" switch at 94 is mounted on the toe board of the vehicle for operation by the driver's foot.

Combination turn signals and warning lights are mounted on a pair of upright poles 114 and 116 at the forward end of the vehicle. Such lights, such as light 118 shown in FIG. 1, are mounted atop the poles. The lights may be connected in a conventional turn signal flashing circuit, the switch for which is shown on the dashboard in FIG. 3 at 120. The lights, such as light 118, are elevated sufficiently above the road so as to be readily visible from other vehicles. Suitable headlights or the like may also be mounted on the poles as indicated at 122.

Preferably the field windings resistances of the motors are of a high order in relation to the resistances of the armature windings, such as 2:1 or greater, and I have found that a ratio of 100:1 is very satisfactory.

FIG. 5 discloses an arrangement whereby the operating range of the vehicle may be extended, and in the absence of a commercial source of electrical energy for charging the batteries, may provide for such charging. The arrangement includes a trailer 150 detachably connected to the rear of vehicle 8 and upon the road wheel supported frame of which is mounted a standard 115 volt alternating current engine-generator set 152 of the type readily available commercially, including an internal combustion engine 154 or the like drivingly connected to a generator 156. The generator may be detachably connected through suitable leads 159 to transformer and rectifier circuits (see FIG. 4) for charging each of the batteries 42, 44 and 46 simultaneously or separately. The transformer and rectifier equipment 160 is preferably mounted on the vehicle.

To extend the operating range of the vehicle, the engine 154 is started and operated during operation of the vehicle. The size of the engine is such in relation to the generator, and the generator output is such in relation to the current drain on the batteries that during uniform speed of the vehicle on level ground the generator will just slightly charge the batteries. During acceleration and hill climbing the battery drain will exceed the generator output.

When the trailer and generator set are not needed to extend the range of the vehicle, the unit can also be used as an emergency source of electric energy for the home suitable for operating essential electrical devices during power interruption.

What is claimed is:

1. An electrically driven road vehicle assembly comprising, in combination: a road tractor vehicle having a road-engaging driving wheel, direct current motor means mounted on the tractor vehicle and comprising the sole prime mover on the tractor vehicle and connected to said driving wheel to drive the same, a plurality of electrically rechargeable cells connected in series and carried by the tractor vehicle with said series having an outside positive terminal at one end and an outside negative terminal at the other end, electric circuits for electrically connecting said cells to the motor means to power and vary the voltage applied to the motor means, a trailer vehicle connected to the tractor vehicle, an engine-generator set mounted on the trailer vehicle for supplying a recharging current at a voltage higher than that of the serially connected cells, an electric circuit operably independent of said circuits for varying voltage applied to the motor means and connected to the electrical generator of said set and to the two outside terminals of said series of cells to electrically recharge the same, and said engine-generator set sized to electrically recharge said series of cells during motor operation at minimum power drain but of insufficient size to electrically recharge the series of cells at maximum power drain.

2. The invention as defined in claim 1 characterized in that the trailer vehicle is detachably connected to the tractor vehicle and the electric circuit connecting the generator to the cells includes a disconnectable portion whereby the trailer vehicle may be wholly disconnected from the tractor vehicle.

References Cited by the Examiner
UNITED STATES PATENTS

| 632,874 | 9/99 | Leitner. | |
|---|---|---|---|
| 992,682 | 5/11 | Muller. | |
| 1,256,228 | 2/18 | Hensley | 320—61 X |
| 1,291,233 | 1/19 | Storer | 318—139 |
| 1,429,173 | 9/22 | Stern | 240—57 |
| 1,678,366 | 7/28 | Tann | 240—57 X |
| 2,091,594 | 8/37 | Innes | 98—2 |
| 2,496,601 | 2/50 | Schamblin. | |
| 2,738,492 | 3/56 | Arneson et al. | 240—7.1 X |

FOREIGN PATENTS

| 702,516 | 1/31 | France. |
|---|---|---|
| 358,897 | 5/38 | Italy. |
| 100,813 | 2/41 | Sweden. |
| 23,505 | 1/01 | Switzerland. |

A. HARRY LEVY, *Primary Examiner.*

PHILIP ARNOLD, *Examiner.*